(12) United States Patent
Golyshkov et al.

(10) Patent No.: US 9,321,305 B2
(45) Date of Patent: Apr. 26, 2016

(54) RAILWAY WHEEL

(71) Applicant: JOINT STOCK COMPANY "VYKSA STEEL WORKS", Vyksa (RU)

(72) Inventors: Roman Anatolievich Golyshkov, Vyksa (RU); Dmitry Evgenievich Kerentsev, Samara (RU)

(73) Assignee: JOINT STOCK COMPANY "VYKSA STEEL WORKS", Vyksa (RU)

( * ) Notice: Subject to any disclaimer, the term of this patent is extended or adjusted under 35 U.S.C. 154(b) by 123 days.

(21) Appl. No.: 14/365,605

(22) PCT Filed: Dec. 14, 2012

(86) PCT No.: PCT/RU2012/001072
§ 371 (c)(1),
(2) Date: Jun. 13, 2014

(87) PCT Pub. No.: WO2013/089596
PCT Pub. Date: Jun. 20, 2013

(65) Prior Publication Data
US 2014/0300122 A1   Oct. 9, 2014

(30) Foreign Application Priority Data

Dec. 16, 2011  (RU) ................................ 2011151692

(51) Int. Cl.
*B60B 17/00*   (2006.01)

(52) U.S. Cl.
CPC ......... *B60B 17/0006* (2013.01); *B60B 17/0055* (2013.01); *B60B 2900/111* (2013.01); *B60B 2900/311* (2013.01)

(58) Field of Classification Search
CPC  B60B 17/00; B60B 17/0006; B60B 17/0055; B60B 2900/311; B60B 2900/11; B60B 3/02
USPC ..................... 295/1, 21, 22, 24; 301/62, 63 R
See application file for complete search history.

(56) References Cited

U.S. PATENT DOCUMENTS

| | | | | |
|---|---|---|---|---|
| 5,039,152 A | * | 8/1991 | Esaulov | B60B 17/0006 295/21 |
| 5,339,926 A | * | 8/1994 | McCanse | B66F 7/04 187/204 |
| 5,957,517 A | * | 9/1999 | Chen | B25J 15/106 294/86.4 |

FOREIGN PATENT DOCUMENTS

| | | |
|---|---|---|
| DE | 1405588 | 1/1969 |
| DE | 3117572 | 5/1981 |
| EP | 1470006 | 5/2008 |
| RU | 2085403 | 7/1997 |
| RU | 2259279 | 8/2005 |
| RU | 2007112470 | 10/2008 |
| SU | 1139647 | 2/1985 |
| WO | WO 03/064182 A1 * | 7/2003 |

OTHER PUBLICATIONS

International Search Report dated May 23, 2013 for PCT/RU2012/001072.
* cited by examiner

*Primary Examiner* — S. Joseph Morano
*Assistant Examiner* — Jean Charleston
(74) *Attorney, Agent, or Firm* — Mintz Levin Cohn Ferris Glovsky and Popeo, P.C.

(57) ABSTRACT

The invention relates to transport engineering, in particular to railway transportation vehicle wheels.
Essence of invention: A railway wheel having a central plane perpendicular to an axis of rotation of the wheel which includes a rim formed by a tread surface and a flange, and also includes a hub and a web formed by external and internal surfaces and made in such a way that a theoretical midline of a transverse web profile passes through a first point located in a place of matching the web with the rim, a central point where the theoretical midline has maximum offset from the central plane in a direction opposite to the flange, and a second point located in a place of matching the web with the hub, wherein the external and internal surfaces of the web are formed by external and internal radius curves, respectively, wherein radiuses of the first and the second external radius curves for the external web surface are from 0.04 to 0.05 of a tread diameter, the radius of the third external radius curve is from 0.08 to 0.1 of the tread diameter, the radius of the fourth external radius curve is from 0.07 to 0.09 of the tread diameter, and the radius of the first internal radius curve for the internal web surface is from 0.08 to 0.1 of the tread diameter, radiuses of the second and the third internal radius curves are from 0.06 to 0.08 of the tread diameter, the radius of the fourth internal radius curve is from 0.04 to 0.06 of the tread diameter, wherein the first point is offset to a distance not more than 0.08 of the rim width from the central plane in the direction opposite to the flange, the central point is offset from the central plane to a distance within a range of values from 0.35 to 0.4 of the rim width, and the second point is offset to a distance not more than 0.1 of the rim width from the central plane towards the flange, while a ratio of a web thickness at the first point to a web thickness at the second point is from 0.7 to 1.1 and the ratio of a web thickness at the central point to the web thickness at the second point is from 0.7 to 0.9.

1 Claim, 6 Drawing Sheets

RAILWAY WHEEL

CROSS-REFERENCE TO RELATED APPLICATIONS

This application is a national stage application, filed under 35 U.S.C. §371, of PCT Application No. PCT/RU2012/001072, filed on Dec. 14, 2012, which claims priority to Russian patent application no. RU 2011151692 filed on Dec. 16, 2011, the contents of which are incorporated herein by reference in their entirety for all purposes.

The invention relates to transport engineering, in particular to railway wheel design.

Railway wheels used in different countries have differences in design which are associated with operation conditions of rolling stock, designs of cars and locomotives as well as with certain traditions developed in the production of wheel sets and their operation in railway transport. Alongside with that, a wheel in any case consists of three main parts: a rim, a hub and a web.

The choice of shape of a wheel web is the most important task to provide wheel basic performance characteristics such as weight, stiffness and load capacity.

Wheels with webs of different design are known in world practice, the design being often dictated by size and a mutual position of the rim relative to the hub. The present invention is intended for use in the European railway system, where the most widely used are standard wheels with tangential web profile, so-called ORE-wheels, which are currently used for loads up to 22.5 tnf per axle of a wheel set. This wheel design has high levels of stresses under thermal loads arising from friction of wheels against brake shoes, as well as mechanical loads acting on the wheel when it runs on curved sections of the track. In addition, a significant drawback of the ORE-wheels is their high weight.

The railway wheel design according to the patent DE 3 117 572 is known with a bell-shaped web, where the midline is determined by a cosine function, which received wide circulation in the European railways at maximum loads up to 23.5 ton-forces (tnf) per axle of a wheel set. The present design has minimum weight among all known analogues. However, in order to use the present wheel design for higher axle loads an increase in the thickness of the web and walls of the hub is required hereupon the advantage of the lower weight of the wheel is lost.

One solution variant of the present problem is described in the invention EP 1 470 006 taken as a prototype of the present invention, where the transverse profile of the wheel web is located around the theoretical midline passing through three characteristic points, while the indicated first point in the place of matching the web with the rim and the indicated second point in the place of matching the web with the hub are located in the same plane which is perpendicular to the axis of wheel rotation and is offset from the central plane towards the external surface of the wheel rim. The distance between said plane and the indicated central point of the theoretical midline of the wheel web is maximum 0.5 of the wheel rim width. The advantage of this design is the possibility of increasing the thickness of the web in the zone in which it matches the hub, where the level of stresses caused by mechanical loads is high, but the weight of the present structure and the level of stresses from thermal loads is greatly increased in comparison with the wheel according to the patent DE 3 117 572. The wheels of the present design are not widely used.

The technical result the present invention is directed to select the optimal shape of the wheel web that can provide enhanced performance characteristics of railway wheels, namely:

the low-stressed state of the wheel from the action of operating loads;

the possibility of use at maximum load higher than 23.5 tnf per axle, while ensuring minimal structural weight among all known analogues;

the low degree of lateral deformation of the wheel rim during its heating in the process of friction against the brake shoes and subsequent cooling.

The technical result is achieved by that a railway wheel having a central plane perpendicular to an axis of rotation of the wheel which includes a rim formed by a tread surface and a flange, and also includes a hub and a web formed by external and internal surfaces and made in such a way that a theoretical midline of a transverse web profile passes through a first point located in a place of matching the web with the rim, a central point where the theoretical midline has maximum offset from the central plane in a direction opposite to the flange, and a second point located in a place of matching the web with the hub, wherein an external surface of the web is formed on a rim side by a first external radius curve and on a hub side by a second external radius curve with a curvature that coincides in a direction with the curvature of the first external radius curve, said curves matching each other in a central part of the web by a third, on the rim side, and a fourth, on the hub side, external radius curves with a curvature opposite to the direction of the curvature of the first and second external radius curves, while an internal surface of the web is formed on the rim side by a first internal radius curve and on the hub side by a second internal radius curve with a curvature that coincides to the direction of the curvature of the first internal radius curve, said curves matching each other in the central part of the web by the third, on the rim side, and the fourth, on the hub side, internal radius curves with the curvature opposite to the direction of the curvature of the first and the second internal radius curves, wherein radiuses of the first and the second external radius curves for the external web surface are from 0.04 to 0.05 of a tread diameter, the radius of the third external radius curve is from 0.08 to 0.1 of the tread diameter, the radius of the fourth external radius curve is from 0.07 to 0.09 of the tread diameter, and the radius of the first internal radius curve for an internal web surface is from 0.08 to 0.1 of the tread diameter, radiuses of the second and the third internal radius curves are from 0.06 to 0.08 of the tread diameter, the radius of the fourth internal radius curve is from 0.04 to 0.06 of the tread diameter, wherein the first point is offset to a distance not more than 0.08 of the rim width from the central plane in the direction opposite to the flange, the central point is offset from the central plane to a distance within a range of values from 0.35 to 0.4 of the rim width, and the second point is offset to a distance not more than 0.1 of the rim width from the central plane towards the flange, while a ratio of a web thickness at the first point to a web thickness at the second point is from 0.7 to 1.1 and the ratio of a web thickness at the central point to the web thickness at the second point is from 0.7 to 0.9.

During operation of the shoe brakes, the wheel is able to absorb repeated cycles of thermal loading of 55 kW for 45 minutes without any adverse effects with respect to the rim deformation degree when the rim is heated and then cooled. Besides, the ratio of the web thickness at the first point to the web thickness at the second point within a range of from 0.7 to 1.1 and the ratio of the web thickness at the central point to the web thickness at the second point within a range of from 0.7 to 0.9, along with the web configuration above, make it possible to strengthen the most stressed parts of the wheel in places where the web matches the rim and the hub, thereby to provide the possibility to use the wheels at a maximum load of above 23.5 tnf per axle with the structure weight being by 5 to 10% lower than that of all known analogues.

Selection of other values for radiuses of curves which form the external and internal surfaces of the web of the wheel having said configuration, intervals and directions of offsets of the characteristic points of the web theoretical midline from the central plane, as well as the ratios of thicknesses in these points do not allow accomplishment of an optimal combination of the low-stressed state of the wheel design under action of various kinds of operating loads, the minimum weight and the satisfactory degree of lateral rim deformation under thermal loading.

The essence of the invention is explained by following drawings and diagrams, wherein.

Figure 1:
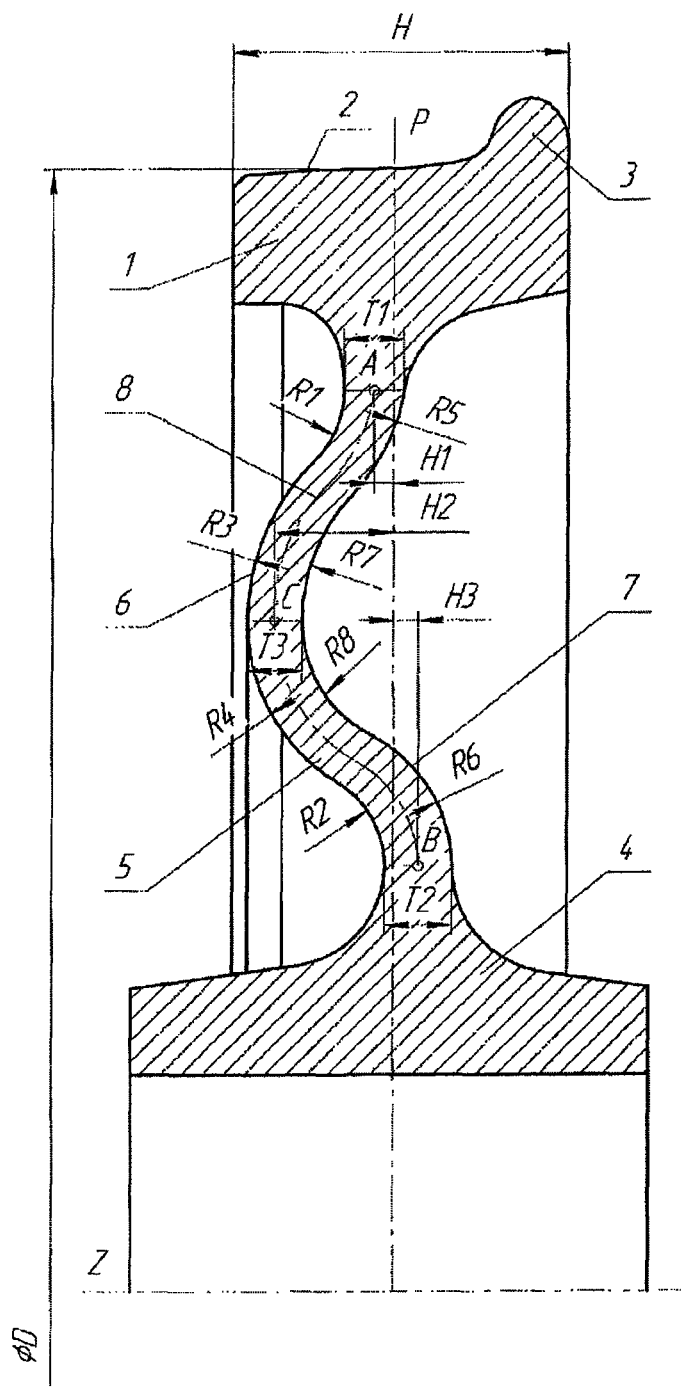
FIG. 1 is a radial section of a railway wheel.

The railway wheel shown in FIG. 1 has a central plane P perpendicular to a rotation axis Z of the wheel that includes a rim 1 formed by a tread surface 2 and a flange 3, and includes a hub 4, and a web 5 formed by external 6 and internal 7 surfaces and designed in such a way that a theoretical midline 8 of a web cross profile passes through a first point A located in the place of matching the web with the rim 1, a central point C where the theoretical midline 8 has maximum offset from the central plane P in a direction opposite to the flange 3, and a second point B located in the place of matching the web 5 with the hub 4. The specified central plane P of the wheel web 5 passes through the wheel rim 1 in the place where a tread diameter D is measured.

The external surface 6 of the web 5 is formed on the rim 1 side by a first external radius curve R1 and on the hub 4 side by a second external radius curve R2 with a curvature that coincides in a direction with the curvature of the first external radius curve R1, said curves matching each other in a central part of the web by a third R3, on the rim 1 side, and a fourth R4, on the hub 4 side, external radius curves with a curvature opposite to the direction of curvature of the first R1 and second R2 external radial curves, and the internal surface 7 of the web 5 is formed on the rim 1 side by a first internal radius curve R5 and on the hub 4 side by a second internal radius curve R6 with a curvature that coincides to the direction of the curvature of the first internal radius curve R5, said curves matching each other in the central part of the web 5 by a third R7, on the rim 1 side, and a fourth R8, on the hub 4 side, internal radius curves with a curvature opposite in the direction of the curvature of the first R5 and second R6 internal radial curves.

The first point A is offset to a distance H1 not more than 0.08 of a rim width H from the central plane P in the direction opposite to the flange 3, the central point C is offset from the central plane P to a distance H2 from 0.35 to 0.4 of the rim width H, and the second point B is offset to a distance H3 not more than 0.1 of the rim width H from the central plane P towards the flange 3.

A ratio of a thickness T1 of the web 5 at the first point A to a thickness T2 of the web 5 at the second point B is from 0.7 to 1.1, and a ratio of a thickness T3 of the web 5 at the central point C to a thickness T2 at the second point B is from 0.7 to 0.9.

According to the invention, selection of an optimal shape of the wheel web is performed using the finite element analysis of different variants of the designs according to techniques described in UIC 510-5 standard and UIC B 169/RP 17 report that make it possible to determine the stress-strain state of the wheel from action of mechanical and thermal loads mostly critical in operation.

Figure 2:
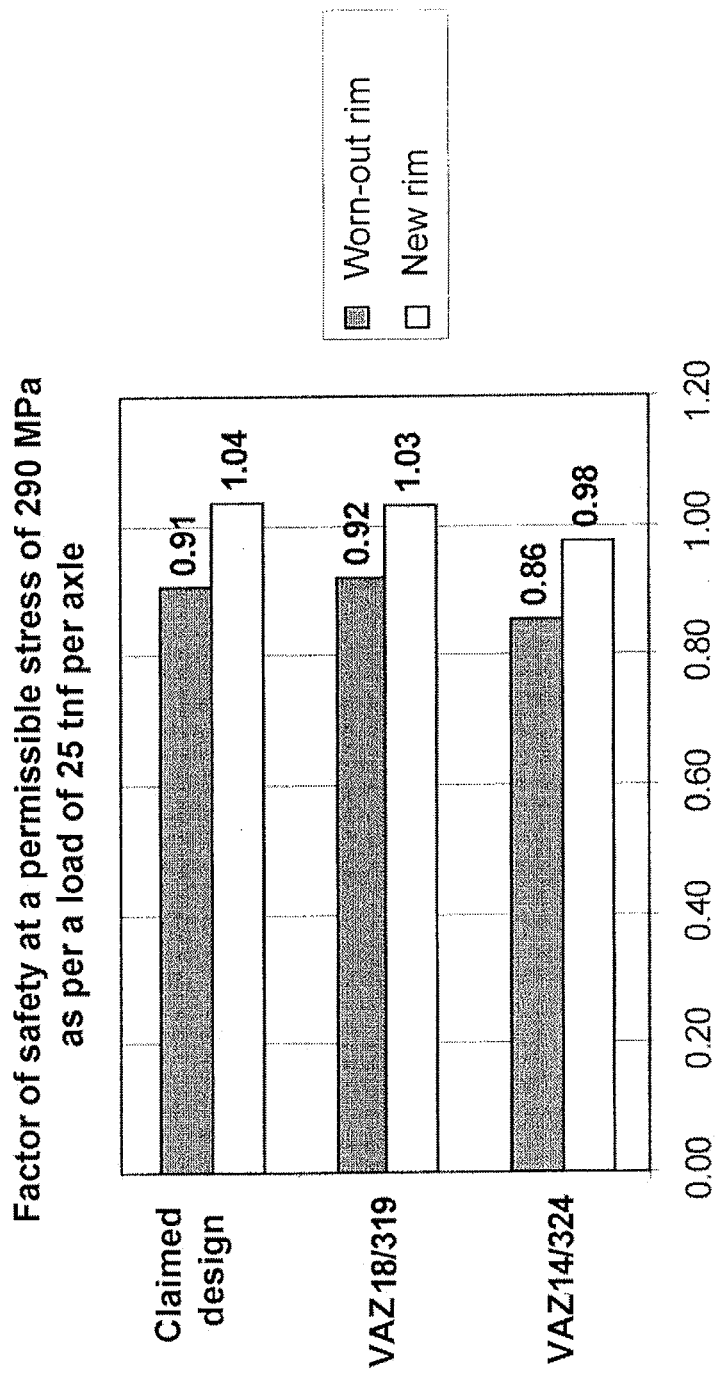
FIG. 2 is a diagram for comparative estimation of mechanical properties of the claimed design and prior art designs of railroad wheels.
Figure 3A:
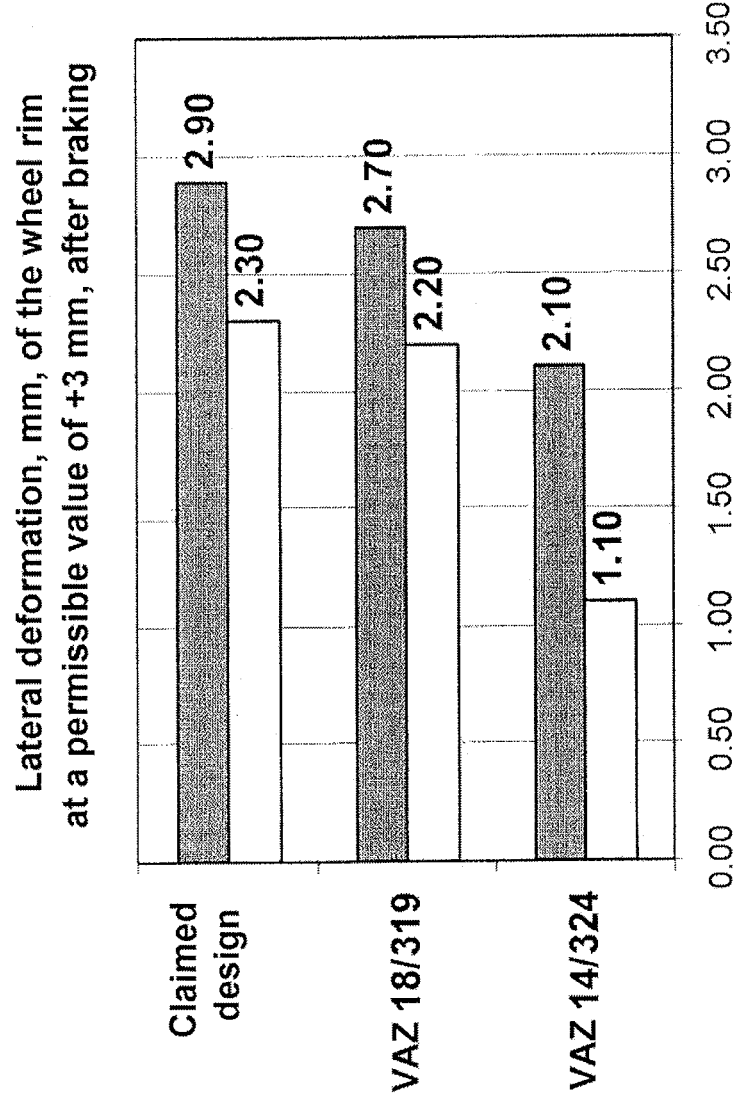
FIGS. 3a, 3b and 4a, 4b are diagrams for comparative estimation of thermomechanical properties of the claimed design prior art designs of railroad wheels.
Figure 3B:
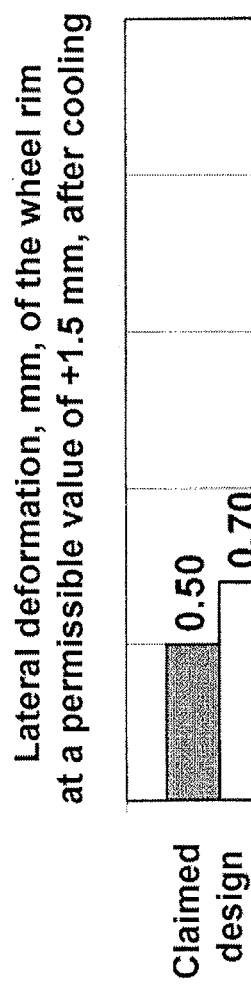
Figure 3B:
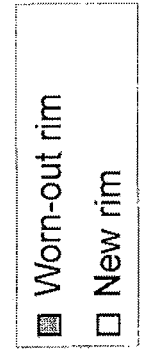
Figure 4A:
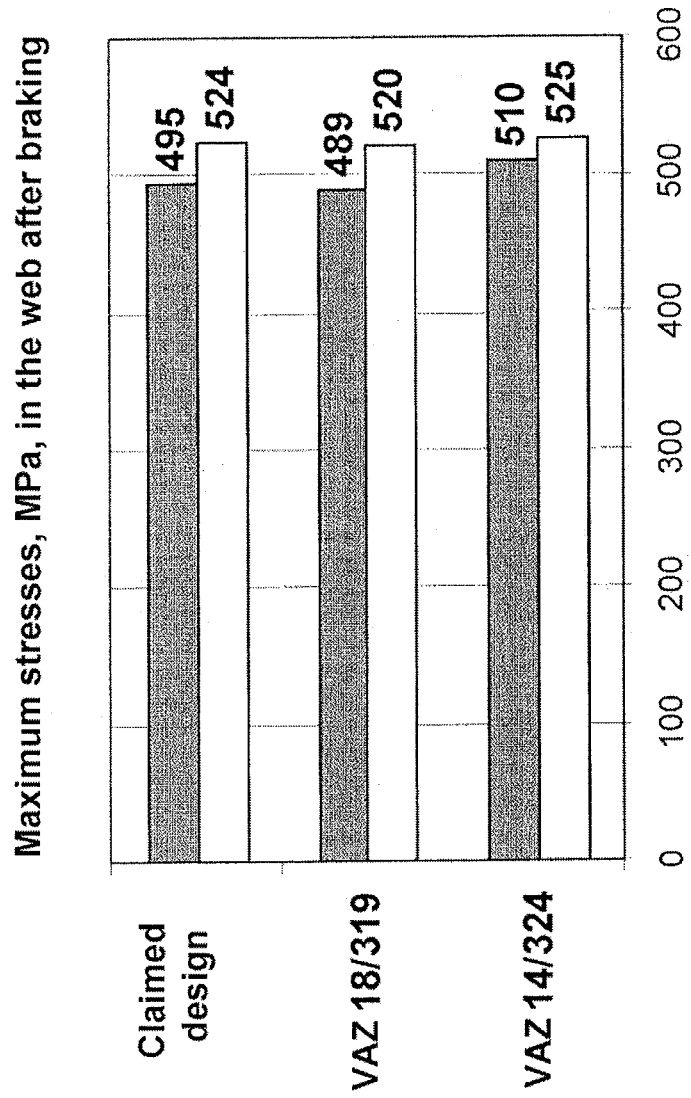
Figure 4B:
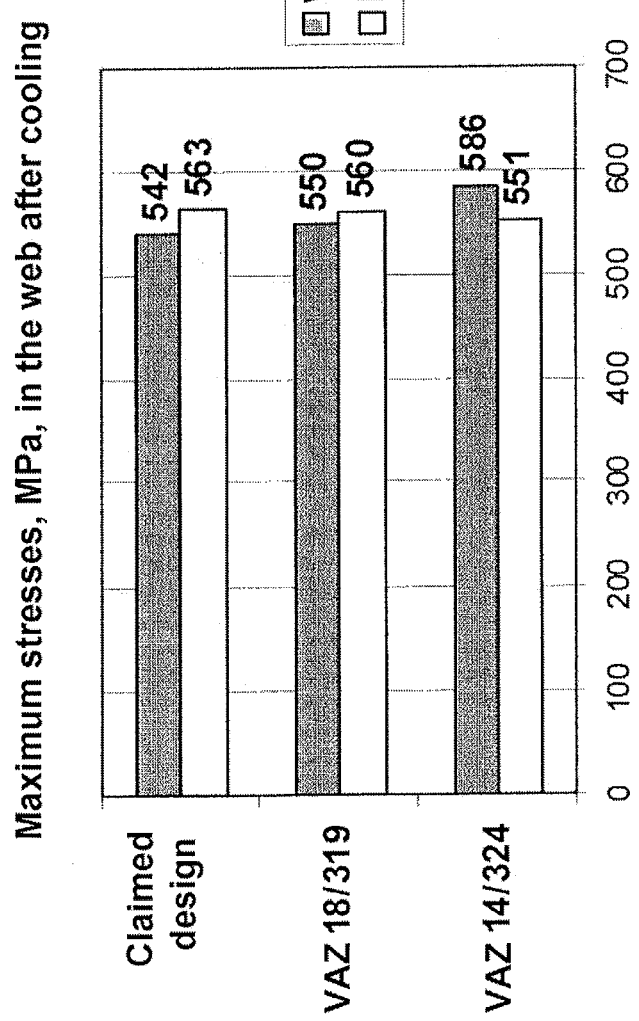

As a result of computations performed in accordance with requirements of EN 13979-1, the claimed design, as shown in FIG. 2, has fatigue strength characteristics of the web which are better as compared to the designs of similar purpose wheels VAZ14/324 and VAZ18/319, along with provision for a structural weight that is lower by 7 and 19 kg, respectively The analysis of the state of the art conducted by the Applicant that included search of patent and research-and-technology sources of information and detection of sources that contain data on analogues of the claimed invention showed that the applicant did not find an analogue characterized by the features identical to all essential features of the claimed invention.

In the process of determination of a prototype from among a list of detected analogues a set of essential characteristic features of the claimed Railway Wheel with respect to the target technical result was identified that are described in the claims.

Results of computer simulation of bench tests at application of brakes to wheels, as shown in FIGS. 3a, 3b and 4a, 4b and performed in accordance with UIC B 169/RP 17, characterize the claimed design by the degree of lateral deformation of the rim and the level of stresses in the wheel comparable with that in the existing analogues.

The analysis of the prior art conducted by the Applicant and including the search through patent and scientific-and-research references, and the detection of references containing information about analogues of the present invention make it possible to establish that the Applicant could not detect an analogue defined by features adequate (identical) to all essential features of the claimed invention.

Definition of the prototype from the list of detected analogues allowed detection of the combination of features essential with respect to the discerned technical result in the claimed "Railway Wheel" and stated in the set of claims.

The search results showed that the claimed invention does not explicitly appear for an expert from the prior art determined by the Applicant, and no influence of transformations provided for by the essential features of the claimed invention on accomplishment of the technical result was detected.

The proposed invention can be used for all models of railway transportation facilities vehicles that use shoe brakes, especially for railroad freight cars, leading vehicles and locomotives. Good consistency of fatigue strength in critical zones of the wheel—in the places of wheel web transition to the hub and to the rim—permits use of the present design also for the railway transport where disc brakes are used instead of shoe brakes, as is the case with regard to passenger cars. According to the invention, a wheel can be manufactured from steel of any quality used in the railroad industry, and produced in accordance with well-known technical requirements and standards by rolling, forging or casting.

Theoretical studies and testing of railway wheels with the web configuration according to the claimed set of claims with respect to freight cars for the European railway system have shown compliance with all safety requirements and the ability to provide the optimal level of performance of the wheels.

This proves the achievement of the technical result indicated by the Applicant.

The invention claimed is:

1. A railway wheel having a central plane perpendicular to an axis of rotation of the wheel which includes a rim formed by a tread surface and a flange, and also includes a hub and a web formed by external and internal surfaces and made in such a way that a theoretical midline of a transverse web profile passes through a first point located in a place of matching the web with the rim, a central point where the theoretical midline has maximum offset from the central plane in a direction opposite to the flange, and a second point located in a place of matching the web with the hub, wherein an external surface of the web is formed on a rim side by a first external radius curve and on a hub side by a second external radius curve with a curvature that coincides in a direction with the curvature of the first external radius curve, said curves matching each other in a central part of the web by a third, on the rim side, and a fourth, on the hub side, external radius curves with a curvature opposite in the direction to the curvature of the first and second external radius curves, while an internal surface of the web is formed on the rim side by a first internal radius curve and on the hub side by a second internal radius curve with a curvature that coincides to the direction with the curvature of the first internal radius curve, said curves matching each other in the central part of the web by the third, on the rim side, and the fourth, on the hub side, internal radius curves with the curvature opposite in the direction to the curvature of the first and the second internal radius curves, said railway wheel being characterized in that radiuses of the first and the second external radius curves for the external web surface are from 0.04 to 0.05 of a tread diameter, the radius of the third external radius curve is from 0.08 to 0.1 of the tread diameter, the radius of the fourth external radius curve is from 0.07 to 0.09 of the tread diameter, and the radius of the first internal radius curve for the internal web surface is from 0.08 to 0.1 of the tread diameter, radiuses of the second and the third internal radius curves are from 0.06 to 0.08 of the tread diameter, the radius of the fourth internal radius curve is from 0.04 to 0.06 of the tread diameter, wherein the first point is offset to a distance not more than 0.08 of the rim width from the central plane in the direction opposite to the flange, the central point is offset from the central plane to a distance within a range of values from 0.35 to 0.4 of the rim width, and the second point is offset to a distance not more than 0.1 of the rim width from the central plane towards the flange, while the ratio of a web thickness at the first point to a web thickness at the second point is from 0.7 to 1.1 and a ratio of a web thickness at the central point to the web thickness at the second point is from 0.7 to 0.9.

* * * * *